United States Patent
Hashimoto

(10) Patent No.: US 9,535,235 B2
(45) Date of Patent: Jan. 3, 2017

(54) IMAGING LENS COMPOSED OF SIX OPTICAL ELEMENTS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 14/628,690

(22) Filed: Feb. 23, 2015

(65) Prior Publication Data
US 2015/0241665 A1   Aug. 27, 2015

(30) Foreign Application Priority Data

Feb. 24, 2014   (JP) ................................. 2014-032844

(51) Int. Cl.
| | | |
|---|---|---|
| *G02B 13/00* | (2006.01) | |
| *G02B 13/18* | (2006.01) | |
| *G02B 9/62* | (2006.01) | |

(52) U.S. Cl.
CPC ............. *G02B 13/0045* (2013.01); *G02B 9/62* (2013.01); *G02B 13/0055* (2013.01); *G02B 13/18* (2013.01)

(58) Field of Classification Search
CPC ... G02B 13/0045; G02B 9/62; G02B 13/0055; G02B 13/0075; G02B 13/02; G02B 13/18; G02B 9/64
See application file for complete search history.

(56) References Cited

U.S. PATENT DOCUMENTS

| | | | | |
|---|---|---|---|---|
| 2,803,996 A * | 8/1957 | Bouwers | .................. | G02B 9/00 359/708 |
| 4,447,137 A * | 5/1984 | Arai | ........................ | G02B 13/02 359/745 |
| 7,864,454 B1 * | 1/2011 | Tang | ........................ | G02B 9/60 359/714 |
| 9,151,931 B1 * | 10/2015 | Chen | .................. | G02B 13/0045 |
| 2015/0098002 A1 * | 4/2015 | Wang | ..................... | G02B 13/18 348/333.11 |
| 2016/0091695 A1 * | 3/2016 | Chen | ........................ | G02B 9/62 359/713 |

FOREIGN PATENT DOCUMENTS

| | | |
|---|---|---|
| JP | 2010-26434 A | 2/2010 |
| JP | 2011-85733 A | 4/2011 |

* cited by examiner

*Primary Examiner* — Jordan Schwartz
(74) *Attorney, Agent, or Firm* — Oliff PLC

(57) ABSTRACT

A compact low-profile low-cost imaging lens with an F-value of 2.5 or less and a wide field of view which corrects aberrations properly. Its elements are arranged from an object side: a first positive optical element group including a first positive lens having a convex object-side surface and a second negative lens having a concave image-side surface; a second positive optical element group including a third positive lens having a convex image-side surface; and a third negative optical element group including a fourth negative double-sided aspheric lens having a concave image-side surface and a fifth double-sided aspheric lens having a concave object-side surface. The fourth lens image-side surface has at least one pole-change point off an optical axis. A double-sided aspheric aberration correction optical element with virtually no refractive power is located in an air gap between the first and second optical element groups.

7 Claims, 10 Drawing Sheets

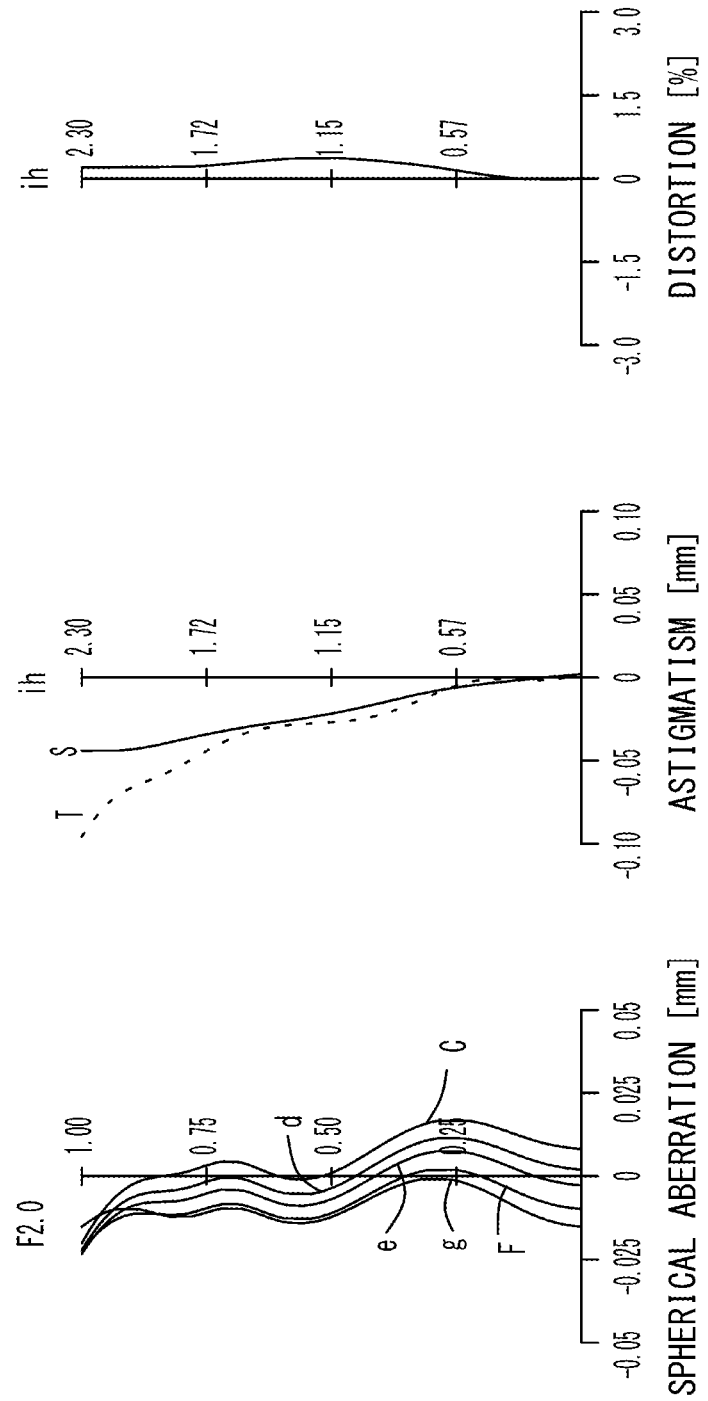

IMAGING LENS COMPOSED OF SIX OPTICAL ELEMENTS

The present application is based on and claims priority of Japanese patent application No. 2014-032844 filed on Feb. 24, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens composed of six optical elements which is built in an image pickup device mounted in an increasingly compact and low-profile smartphone or mobile phone, PDA (Personal Digital Assistant), game console, information terminal such as a PC, or home appliance with a camera function.

In the present invention, whether or not an optical element is a lens depends on whether or not it has refractive power on an optical axis. An optical element having refractive power on the optical axis is called a lens. An optical element which does not have a lens function can contribute to improvement of aberrations in the peripheral area of an image without changing the overall focal length. In terms of lens surface shape, a convex surface or a concave surface means that the paraxial portion of the surface (the portion near the optical axis) is convex or concave. A "pole-change point" on an aspheric surface means a point on the aspheric surface at which a tangential plane intersects the optical axis perpendicularly.

Description of the Related Art

In recent years, there has been a general tendency that many information terminals have a camera function. Also, home appliances with a camera have been introduced into the market. For example, a user who is away from home can see in real time what is going on at home, through the camera mounted in a home appliance by telecommunication between the home appliance and his/her smartphone. It is thought that products which enhance consumer convenience by adding a camera function to an information terminal or home appliance will be increasingly developed in the future. The camera mounted in such products is required not only to provide high resolution to cope with an increase in the number of pixels but also to be compact and low-profile and offer high brightness and a wide field of view. In particular, the imaging lens to be built in a mobile terminal is strongly required to be low-profile enough to be applicable to a low-profile product.

However, in order to provide a low-profile imaging lens with a wide field of view and high brightness as described above, the following problem has to be addressed: it is difficult to correct aberrations in the peripheral area of an image and deliver high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses a compact imaging lens composed of five constituent lenses in which a first positive lens, a second positive lens, a third negative lens, a fourth positive lens and a fifth negative lens are arranged in order from an object side. The imaging lens offers brightness with an F-value of about 2 and corrects various aberrations properly.

Patent Document 2 discloses an imaging lens which includes a first lens group including a first lens having a convex surface on an object side, a second lens group including a second lens having a concave surface on an image side, a third lens group including a third meniscus lens having a concave surface on the object side, a fourth lens group including a fourth meniscus lens having a concave surface on the object side, and a fifth lens group including a fifth meniscus lens having an aspheric surface with an inflection point on the object side. This configuration is intended to provide a compact high-resolution imaging lens system.

The imaging lens described in Patent Document 1, composed of five constituent lenses, corrects various aberrations properly and offers high brightness with an F-value of about 2.0 to about 2.5; however, its total track length is longer than the diagonal length of the effective imaging plane of the image sensor, which is disadvantageous in making the imaging lens low-profile. Furthermore, if this lens configuration is designed to offer a wide field of view, it will be difficult to correct aberrations in the peripheral area of the image.

The imaging lens described in Patent Document 2 is a relatively low-profile lens system which corrects aberrations properly. However, in order for this configuration to offer brightness with an F-value of 2.8 or less and a field of view of 65 degrees or more, it is necessary to address the problem with difficulty in correction of aberrations in the peripheral area of the image.

As mentioned above, in the conventional art, it is difficult to provide a low-profile high-resolution imaging lens which offers a wide field of view and high brightness.

SUMMARY OF THE INVENTION

The present invention has been made in view of the above problem, and an object thereof is to provide a compact low-cost imaging lens which meets the demand for low-profileness even with a larger number of constituent lenses, offers brightness with an F-value of 2.5 or less and a wide field of view and corrects various aberrations properly.

Here, "low-profile" implies that the total track length is shorter than the diagonal length of the effective imaging plane of the image sensor, and "wide field of view" implies that the field of view is 70 degrees or more. The diagonal length of the effective imaging plane of the image sensor means twice the vertical height from an optical axis to the position where a light ray incident on the imaging lens at a maximum field of view enters the image plane, that is, the diameter of an effective image circle whose radius is the maximum image height.

According to an aspect of the present invention, there is provided an imaging lens composed of six optical elements which forms an image of an object on a solid-state image sensor, in which the elements are arranged in order from an object side to an image side as follows: a first optical element group with positive refractive power including a first lens with positive refractive power having a convex surface on the object side as a first optical element and a second lens with negative refractive power having a concave surface on the image side as a second optical element; a second optical element group with positive refractive power including a third lens with positive refractive power having a convex surface on the image side as a third optical element; and a third optical element group with negative refractive power including a fourth double-sided aspheric lens with negative refractive power having a concave surface on the image side as a fourth optical element and a fifth double-sided aspheric lens having a concave surface on the object side as a fifth optical element. The image-side surface of the fourth lens has at least one pole-change point off an optical axis. As a sixth optical element, a double-sided aspheric aberration correction optical element which has virtually no refractive power is located in an air gap between the first optical element group and the second optical element group.

In the above imaging lens composed of six optical elements, the first positive optical element group, the second positive optical element group and the third negative optical element group are arranged in order from the object side, making a so-called telephoto type power arrangement, which is advantageous in making the imaging lens low-profile.

In the above configuration, the first optical element group uses the first positive lens to achieve low-profileness and the second negative lens to correct spherical aberrations and chromatic aberrations properly. The second optical element group uses the third lens, which has relatively strong positive refractive power, to ensure low-profileness and correct coma aberrations and field curvature. The third optical element group uses the fourth negative lens to correct spherical aberrations which occur on the third lens. Also, the fourth lens has an aspheric surface with at least one pole-change point off the optical axis on its image side to correct field curvature and control the angle of a chief ray incident on the image sensor appropriately, and the fifth lens, a double-sided aspheric lens, makes final correction of field curvature and distortion. The aberration correction optical element, which has virtually no refractive power, corrects aberrations in the peripheral area of the image properly through its aspheric surfaces on the both sides.

In the above configuration, since the aberration correction optical element with virtually no refractive power as the sixth optical element has a parallel plate shape near the optical axis, it influences neither the refractive power of the overall optical system of the imaging lens, nor the refractive power of each constituent lens. Therefore, it is effective in correcting aberrations only in the peripheral area without changing the focal length of the optical system. The aberration correction optical element is located in an air gap between the first optical element group and the second optical element group, so that aberrations in the peripheral area of the first optical element group in particular can be corrected properly through the aspheric surfaces on the both sides and thus aberrations of rays over a wide field of view are improved effectively.

In terms of lens surface shape, a convex surface or a concave surface means that the paraxial portion of the surface is convex or concave. A "pole-change point" on an aspheric surface means a point on the aspheric surface at which a tangential plane intersects the optical axis perpendicularly.

Preferably, the imaging lens composed of six optical elements with the above configuration satisfies conditional expressions (1) and (2) below:

$$0.1 < TN/f < 0.5 \quad (1)$$

$$40 < vdN < 60 \quad (2)$$

where
TN: distance on the optical axis between lenses where the aberration correction optical element is located
f: focal length of the overall optical system of the imaging lens
vdN: Abbe number of the aberration correction optical element at d-ray.

The conditional expression (1) defines an appropriate range for the distance of the space where the aberration correction optical element is located, and indicates a condition to ensure low-profileness and correct aberrations in the peripheral area properly. If the value is above the upper limit of the conditional expression (1), the space for the aberration correction optical element would be too large to ensure low-profileness. On the other hand, if the value is below the lower limit of the conditional expression (1), the space for the aberration correction optical element would be too small, which would impose a restriction on the aspheric shapes of the both surfaces of the element and make it difficult to correct aberrations properly.

The conditional expression (2) defines an appropriate range for the Abbe number of the material of the aberration correction optical element. When a material which satisfies the conditional expression (2), that is, a low-dispersion material, is adopted, aberrations in the peripheral area are corrected properly.

In the imaging lens composed of six optical elements with the above configuration, it is preferable that the aspheric surfaces on the both sides of the aberration correction optical element be shaped so as to curve toward the object side with increasing distance from the optical axis. These aspheric surfaces can control the angles of rays emitted from the aberration correction optical element and suppress aberrations of marginal rays. This makes it easy to correct aberrations which may increase as the field of view is wider and the F-value is smaller.

Preferably, the imaging lens composed of six optical elements with the above configuration satisfies a conditional expression (3) below:

$$1.0 < fLG1/f < 2.0 \quad (3)$$

where
fLG1: focal length of the first optical element group
f: focal length of the overall optical system of the imaging lens.

The conditional expression (3) defines an appropriate range for the ratio of the focal length of the first optical element group to the focal length of the overall optical system of the imaging lens, and indicates a condition to ensure low-profileness and correct chromatic aberrations. If the value is above the upper limit of the conditional expression (3), the positive refractive power of the first optical element group would be too weak to ensure low-profileness. On the other hand, if the value is below the lower limit of the conditional expression (3), the positive refractive power of the first optical element group would be too strong to correct chromatic aberrations properly.

Preferably, the imaging lens composed of six optical elements with the above configuration satisfies a conditional expression (4) below:

$$0.3 < fLG2/f < 1.0 \quad (4)$$

where
fLG2: focal length of the second optical element group
f: focal length of the overall optical system of the imaging lens.

The conditional expression (4) defines an appropriate range for the ratio of the focal length of the second optical element group to the focal length of the overall optical system of the imaging lens, and indicates a condition to ensure low-profileness and correct spherical aberrations and coma aberrations. If the value is above the upper limit of the conditional expression (4), the positive refractive power of the second optical element group would be too weak to ensure low-profileness. On the other hand, if the value is below the lower limit of the conditional expression (4), the positive refractive power of the second optical element group would be too strong to correct spherical aberrations and coma aberrations properly.

Preferably, the imaging lens composed of six optical elements with the above configuration satisfies a conditional expression (5) below:

$$-0.8 < fLG3/f < -0.2 \quad (5)$$

where fLG3: focal length of the third optical element group f: focal length of the overall optical system of the imaging lens.

The conditional expression (5) defines an appropriate range for the ratio of the focal length of the third optical element group to the focal length of the overall optical system of the imaging lens, and indicates a condition to ensure low-profileness and correct spherical aberrations and chromatic aberrations. If the value is above the upper limit of the conditional expression (5), the negative refractive power of the third optical element group would be too strong to ensure low-profileness. On the other hand, if the value is below the lower limit of the conditional expression (5), the negative refractive power of the third optical element group would be too weak to correct spherical aberrations and chromatic aberrations properly.

Preferably, the imaging lens composed of six optical elements with the above configuration satisfies a conditional expression (6) below:

$$0.8 < (r5+r6)/(r5-r6) < 2.5 \quad (6)$$

where r5: curvature radius of the object-side surface of the third lens constituting the second optical element group r6: curvature radius of the image-side surface of the third lens constituting the second optical element group.

The conditional expression (6) defines the shape of the third lens constituting the second optical element group, and indicates a condition to ensure low-profileness and correct spherical aberrations properly. When the conditional expression (6) is satisfied, the third lens has a biconvex shape or a meniscus shape with a convex surface on the image side. If the value is above the upper limit of the conditional expression (6), the third lens would have a stronger meniscus shape to cause the image-side principal point position of the third lens to shift toward the image side, which might result in a longer total track length and make it difficult to ensure low-profileness. Furthermore, if so, spherical aberrations might be too excessive to be corrected by the fourth lens. On the other hand, if the value is below the lower limit of the conditional expression (6), the third lens would be a biconvex lens in which the image-side principal point position of the third lens shifts toward the object side, making it difficult to ensure an appropriate back focus, though it would be advantageous in ensuring low-profileness and suppressing spherical aberrations.

More preferably, the imaging lens composed of six optical elements with the above configuration satisfies a conditional expression (6a) below. When the conditional expression (6a) is satisfied, the third lens has a meniscus shape with a convex surface on the image side.

$$1.0 < (r5+r6)/(r5-r6) < 2.5. \quad (6a)$$

Preferably, the imaging lens composed of six optical elements with the above configuration satisfies conditional expressions (7) and (8) below:

$$fLG1 > fLG2 \quad (7)$$

$$fLG2 > |fLG3| \quad (8)$$

where fLG1: focal length of the first optical element group fLG2: focal length of the second optical element group fLG3: focal length of the third optical element group.

The conditional expression (7) defines an appropriate relation between the focal length of the first positive optical element group and the focal length of the second positive optical element group, and indicates a condition to ensure low-profileness and correct various aberrations properly. When the conditional expression (7) is satisfied, the positive refractive power of the first optical element group is prevented from being excessive and aberrations in the first optical element group are corrected easily and the second optical element group is given strong positive refractive power to ensure low-profileness easily. The conditional expression (8) defines an appropriate relation between the focal length of the second positive optical element group and the focal length of the third negative optical element group, and indicates a condition to make it easy for the third negative optical element group to correct spherical aberrations which occur on the third lens with strong positive refractive power for low-profileness.

In addition, in the imaging lens composed of six optical elements with the above configuration, it is preferable that the Abbe number of the optical element with negative refractive power in the first optical element group be from 20 to 30 and the Abbe numbers of the four other optical elements with refractive power be from 40 to 70. When the negative optical element in the first optical element group is made of high-dispersion material, axial chromatic aberrations and chromatic aberrations of magnification can be corrected properly. When the four other optical elements with refractive power are made of low-dispersion material, chromatic aberrations of magnification can be suppressed easily. The above-defined ranges of Abbe numbers suggest that all optical elements with refractive power can be made of plastic material, so the imaging lens can be manufactured at low cost.

BRIEF DESCRIPTION OF THE DRAWINGS

FIG. 10 shows spherical aberration, astigmatism, and distortion of the imaging lens in Numerical Example 5 according to the embodiment of the present invention.

DETAILED DESCRIPTION OF THE PREFERRED EMBODIMENT

Hereinafter, the preferred embodiment of the present invention will be described in detail referring to the accompanying drawings. FIGS. 1, 3, 5, 7, and 9 are schematic views showing the general configurations of the imaging lenses composed of six optical elements in Examples 1 to 5 according to this embodiment of the present invention, respectively. Since all these examples have the same basic lens configuration, the general configuration of an imaging lens according to this embodiment is explained below mainly referring to the schematic view of Example 1.

Figure 1:
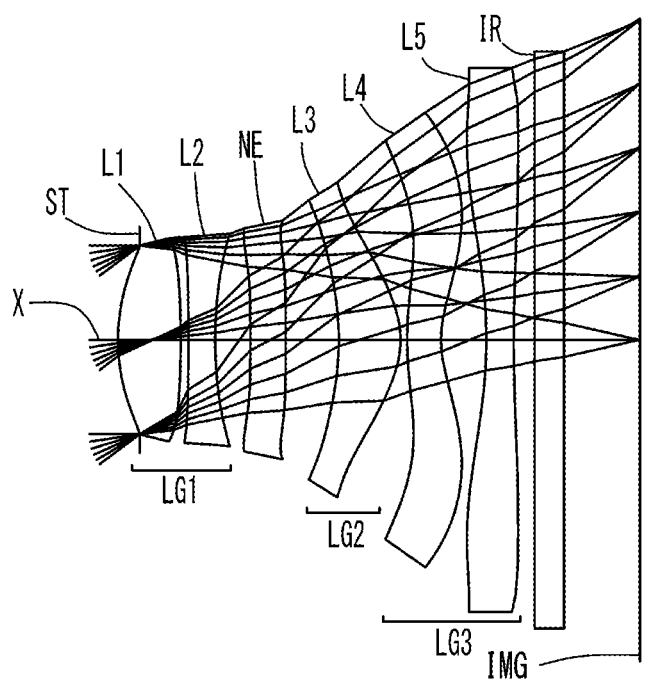
FIG. 1 is a schematic view showing the general configuration of an imaging lens in Numerical Example 1 according to an embodiment of the present invention.

As shown in FIG. 1, the imaging lens composed of six optical elements according to this embodiment includes, in order from an object side, a first optical element group LG1 with positive refractive power including a first positive lens L1 as a first optical element and a second negative lens L2 as a second optical element, a second optical element group LG2 with positive refractive power including a third positive lens L3 as a third optical element, and a third optical element group LG3 with negative refractive power including a fourth negative lens L4 as a fourth optical element and a fifth double-sided aspheric lens L5 as a fifth optical element. As a sixth optical element, a double-sided aspheric aberration correction optical element NE which has virtually no refractive power is located between the first optical element group LG1 and the second optical element group LG2. Thus, the imaging lens according to this embodiment includes a total of six optical elements: five optical elements with refractive power and one aberration correction optical element with virtually no refractive power. As mentioned above, the three lens groups are positive, positive, and negative groups arranged in order from the object side, offering an advantageous configuration to achieve low-profileness, that is, a short total track length.

A filter IR such as an infrared cut filter is located between the third optical element group LG3 and the image plane IMG. The filter IR is omissible. The total track length and back focus of the imaging lens according to this embodiment are defined as distances calculated without the filter IR. An aperture stop ST is located on the object side of the first lens L1.

In this embodiment, in the first optical element group LG1, the first lens L1, a biconvex lens with relatively strong positive refractive power having a convex surface on the object side and the image side, contributes to low-profileness, and the second lens L2, a biconcave lens with negative refractive power having a concave surface on the object side and the image side, corrects spherical aberrations and chromatic aberrations properly. In the second optical element group LG2, the third lens L3, a meniscus double-sided aspheric lens with the strongest positive refractive power having a convex surface on the image side, contributes to low-profileness and corrects coma aberrations and field curvature. In the third optical element group LG3, the fourth lens L4, a meniscus double-sided aspheric lens with negative refractive power having a concave surface on the image side, effectively corrects spherical aberrations which occur on the third lens L3, and the fifth lens L5, a double-sided aspheric lens having a concave surface on the object side, makes final correction of field curvature and distortion. The image-side surface of the fourth lens L4 has a pole-change point off the optical axis so that the negative refractive power of the fourth lens L4 changes to positive refractive power in the peripheral portion. Thus, since the refractive power of the fourth lens L4 is appropriately changed in the area from the central portion to the peripheral portion, field curvature is corrected and the angle of a chief ray incident on the image sensor is appropriately controlled. Furthermore, since the aberration correction optical element NE, a double-sided aspheric optical element which has a flat surface near the optical axis X on both sides and has virtually no refractive power, is located in the air gap between the first optical element group LG1 and the second optical element group LG2, aberrations in the peripheral area are corrected properly through its aspheric surfaces on both sides.

Figure 3:
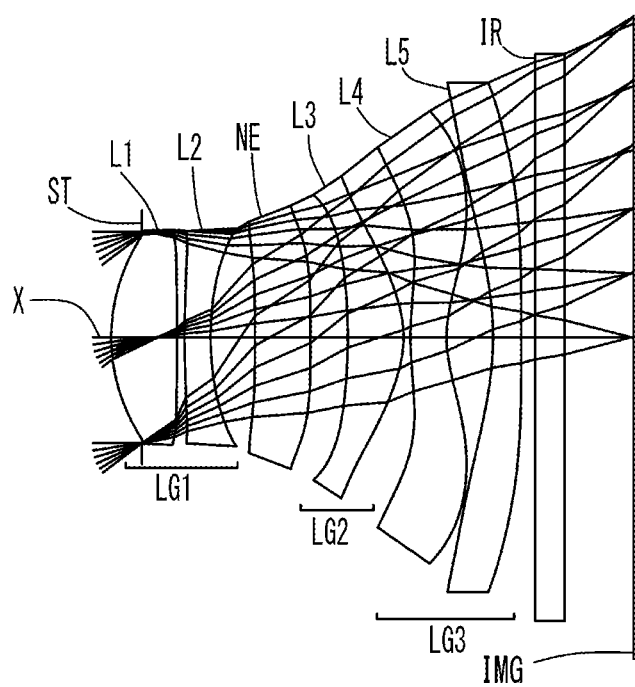
FIG. 3 is a schematic view showing the general configuration of an imaging lens in Numerical Example 2 according to the embodiment of the present invention.
Figure 5:
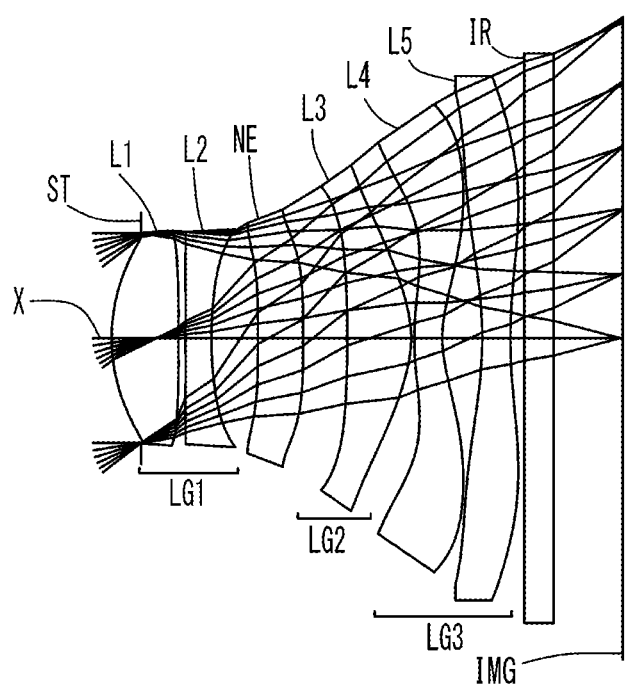
FIG. 5 is a schematic view showing the general configuration of an imaging lens in Numerical Example 3 according to the embodiment of the present invention.
Figure 7:
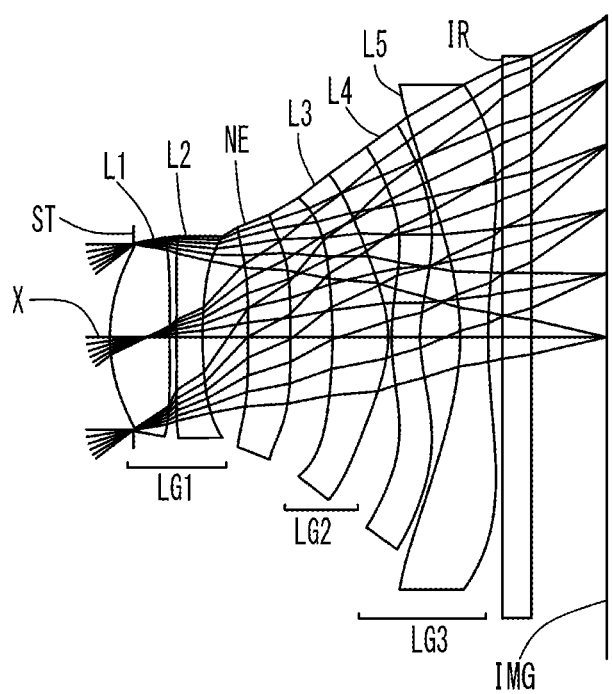
FIG. 7 is a schematic view showing the general configuration of an imaging lens in Numerical Example 4 according to the embodiment of the present invention.

The first lens L1 in the first optical element group LG1 should be a lens with positive refractive power having a convex surface on the object side, and as in FIGS. 3, 5, and 7 in Examples 2, 3, and 4, it may have a meniscus shape with a convex surface on the object side. The second lens L2 in the first optical element group LG1 should be a lens with negative refractive power having a concave surface on the image side, and as in FIGS. 3, 5, 7, and 9 in Examples 2, 3, 4, and 5, it may have a meniscus shape with a concave surface on the image side. The fifth lens L5 in the third optical element group LG3 is a biconcave lens as in FIG. 1 in Example 1, but it may have a meniscus shape with a concave surface on the object side as in FIGS. 3 and 9 in Examples 2 and 5.

Since the aberration correction optical element NE, a double-sided aspheric optical element which has a flat surface near the optical axis X on both sides and has virtually no refractive power, is located between the first optical element group LG1 and the second optical element group LG2, it is easy to correct aberrations in the peripheral area of the first optical element group LG1. Alternatively, it may be located between the second optical element group LG2 and the third optical element group LG3.

The aperture stop ST is located on the object side of the first lens L1. Therefore, the exit pupil position is remote from the image plane IMG, thus it is easy to ensure telecentricity.

Since the aberration correction optical element NE with virtually no refractive power in this embodiment has a parallel plate shape near the optical axis X, it influences neither the refractive power of the overall optical system of the imaging lens, nor the refractive powers of the five constituent lenses from the first lens L1 as the first optical element to the fifth lens L5 as the fifth optical element. Therefore, it is possible to correct aberrations only in the peripheral area without changing parameters such as focal length and lens center thickness.

The both aspheric surfaces of the aberration correction optical element NE are shaped so as to curve toward the object side with increasing distance from the optical axis X.

These aspheric surfaces control the angles of rays emitted from the aberration correction optical element NE and make it easy to suppress aberrations of marginal rays. Consequently, aberrations in the peripheral area which may increase as the field of view is wider and the F-value is smaller are corrected properly.

When the imaging lens composed of six optical elements according to this embodiment satisfies conditional expressions (1) to (8) below, it brings about advantageous effects:

$$0.1 < TN/f < 0.5 \quad (1)$$

$$40 < vdN < 60 \quad (2)$$

$$1.0 < fLG1/f < 2.0 \quad (3)$$

$$0.3 < fLG2/f < 1.0 \quad (4)$$

$$-0.8 < fLG3/f < -0.2 \quad (5)$$

$$0.8 < (r5+r6)/(r5-r6) < 2.5 \quad (6)$$

$$fLG1 > fLG2 \quad (7)$$

$$fLG2 > |fLG3| \quad (8)$$

where

TN: distance on the optical axis X between lenses where the aberration correction optical element NE is located f: focal length of the overall optical system of the imaging lens vdN: Abbe number of the aberration correction optical element NE at d-ray fLG1: focal length of the first optical element group LG1 fLG2: focal length of the second optical element group LG2 fLG3: focal length of the third optical element group LG3 r5: curvature radius of the object-side surface of the third lens L3 constituting the second optical element group r6: curvature radius of the image-side surface of the third lens L3 constituting the second optical element group.

When the imaging lens composed of six optical elements according to this embodiment satisfies conditional expressions (1a) to (6a) below, it brings about more advantageous effects:

$$0.2 < TN/f < 0.4 \quad (1a)$$

$$50 < vdN < 60 \quad (2a)$$

$$1.0 < fLG1/f < 1.5 \quad (3a)$$

$$0.3 < fLG2/f < 0.8 \quad (4a)$$

$$-0.65 < fLG3/f < -0.35 \quad (5a)$$

$$1.0 < (r7+r8)/(r7-r8) < 2.5. \quad (6a)$$

The signs in the above conditional expressions have the same meanings as those in the preceding paragraph.

When the imaging lens composed of six optical elements according to this embodiment satisfies conditional expressions (1b) to (6b) below, it brings about particularly advantageous effects:

$$0.291 \leq TN/f \leq 0.333 \quad (1b)$$

$$55.7 \leq vdN \leq 56.16 \quad (2b)$$

$$1.274 \leq fLG1/f \leq 1.369 \quad (3b)$$

$$0.499 \leq fLG2/f \leq 0.644 \quad (4b)$$

$$-0.544 \leq fLG3/f \leq -0.456 \quad (5b)$$

$$1.229 \leq (r7+r8)/(r7-r8) \leq 1.911. \quad (6b)$$

The signs in the above conditional expressions have the same meanings as those in the preceding paragraph.

When the conditional expression (1) is satisfied, the space for the aberration correction optical element NE is adequately secured and the freedom of the aspheric shape of the aberration correction optical element NE is increased while low-profileness is ensured, and aberrations in the peripheral area are corrected properly.

When the conditional expression (2) is satisfied, the aberration correction optical element NE is made of low-dispersion material and aberrations in the peripheral area can be corrected properly.

When the conditional expression (3) is satisfied, the ratio of the focal length fLG1 of the first optical element group LG1 to the focal length f of the overall optical system of the imaging lens is within an appropriate range to ensure low-profileness and correct chromatic aberrations properly.

When the conditional expression (4) is satisfied, the ratio of the focal length fLG2 of the second optical element group LG2 to the focal length f of the overall optical system of the imaging lens is within an appropriate range to ensure low-profileness and correct spherical aberrations and coma aberrations properly.

When the conditional expression (5) is satisfied, the ratio of the focal length fLG3 of the third optical element group LG3 to the focal length f of the overall optical system of the imaging lens is within an appropriate range to ensure low-profileness and correct spherical aberrations and chromatic aberrations properly.

When the conditional expression (6) is satisfied, the shape of the third lens L3 constituting the second optical element group LG2 is optimized to ensure low-profileness and make it easy to suppress spherical aberrations which occur on the third lens L3.

When the conditional expression (7) is satisfied, the distribution of positive refractive power between the first optical element group LG1 and the third lens L3 constituting the second optical element group LG2 is optimized to ensure low-profileness.

When the conditional expression (8) is satisfied, spherical aberrations which occur on the third lens L3 constituting the second optical element group LG2 with strong positive refractive power are suppressed and it is easy for the third optical element group LG3 to correct aberrations.

In the imaging lens composed of six optical elements according to this embodiment, the Abbe number of the optical element with negative refractive power in the first optical element group LG1 is within the range from 20 to 30, and the Abbe numbers of the four other optical elements with refractive power are within the range from 40 to 70. The negative optical element in the first optical element group LG1 is made of high-dispersion material so as to correct axial chromatic aberrations and chromatic aberrations of magnification properly, and the four other optical elements with refractive power are made of low-dispersion material so as to suppress chromatic aberrations of magnification. Lenses whose Abbe numbers are within these ranges can be made of plastic material. The aberration correction optical element NE can also be made of plastic material which satisfies the conditional expression (2). Therefore, the imaging lens can be manufactured at low cost.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens composed of six optical elements according to this embodiment will be explained. In each example, f denotes the focal length of the overall optical system of the imaging lens, Fno denotes an F-number, ω denotes a half field of view, ih denotes a maximum image height, TLA denotes a total track length with a filter IR removed, and bf denotes a back focus with a filter IR removed. i denotes a surface number counted from the object side, r denotes a curvature radius, d denotes the distance on the optical axis between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

Numerical Example 1

The basic lens data of Numerical Example 1 is shown below.

Example 1

| in mm |
|---|
| f = 3.04 |
| Fno = 2.3 |
| ω(°) = 37.0 |
| ih = 2.30 |
| TLA = 3.66 |
| b f = 0.83 |

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.155 | | |
| 2* | 1.388 | 0.449 | 1.544 | 55.57 |
| 3* | −8.460 | 0.056 | | |
| 4* | −56.627 | 0.190 | 1.635 | 23.97 |
| 5* | 2.725 | 0.253 | | |
| 6* | Infinity | 0.252 | 1.535 | 56.16 |
| 7* | Infinity | 0.380 | | |
| 8* | −2.016 | 0.442 | 1.544 | 55.57 |
| 9* | −0.631 | 0.048 | | |
| 10* | 2.336 | 0.242 | 1.535 | 56.16 |
| 11* | 0.735 | 0.325 | | |
| 12* | −3.248 | 0.195 | 1.535 | 56.16 |
| 13* | 9.950 | 0.150 | | |
| 14 | Infinity | 0.210 | 1.517 | 64.20 |
| 15 | Infinity | 0.539 | | |
| Image Plane | Infinity | | | |

Constituent Lens Data

| Lens | Start Surface | Focal Length |
|---|---|---|
| 1 | 2 | 2.228 |
| 2 | 4 | −4.090 |
| 3 | 8 | 1.519 |
| 4 | 10 | −2.118 |
| 5 | 12 | −4.557 |

Lens Group Data

| | Lens | Focal Length |
|---|---|---|
| 1st Optical Element Group (LG1) | Lens 1, 2 | 3.991 |
| 2nd Optical Element Group (LG2) | Lens 3 | 1.519 |
| 3rd Optical Element Group (LG3) | Lens 4, 5 | −1.388 |

Aspheric Surface Data

| | 2nd Surface | 3rd Surface | 4th Surface | 5th Surface |
|---|---|---|---|---|
| k | 3.857E−01 | 0.000E+00 | 0.000E+00 | −3.085E+01 |
| A4 | −4.944E−02 | −3.279E−01 | −5.177E−01 | −1.417E−01 |
| A6 | 4.052E−02 | 2.024E+00 | 3.585E+00 | 1.580E+00 |
| A8 | −5.292E−01 | −7.987E+00 | −1.215E+01 | −4.142E+00 |
| A10 | 5.449E−01 | 1.797E+01 | 2.447E+01 | 6.154E+00 |
| A12 | 9.296E−01 | −2.561E+01 | −3.265E+01 | −6.943E+00 |
| A14 | −2.958E+00 | 1.557E+01 | 2.091E+01 | 4.411E+00 |
| A16 | 0.000E+00 | 0.000E+00 | 0.000E+00 | 0.000E+00 |

| | 6th Surface | 7th Surface | 8th Surface | 9th Surface |
|---|---|---|---|---|
| k | 0.000E+00 | 0.000E+00 | 0.000E+00 | −4.361E+00 |
| A4 | −3.976E−01 | −2.019E−01 | 1.042E−01 | −2.426E−01 |
| A6 | 4.556E−01 | 1.289E+00 | −3.501E−03 | 3.380E−01 |
| A8 | −4.490E−01 | −2.380E−01 | −2.671E−02 | −1.661E−01 |
| A10 | 1.201E+00 | 4.938E−01 | −1.099E−01 | 9.530E−02 |
| A12 | −8.413E−01 | 0.000E+00 | 9.101E−02 | −6.183E−02 |
| A14 | 0.000E+00 | 0.000E+00 | 0.000E+00 | 1.460E−02 |
| A16 | 0.000E+00 | 0.000E+00 | 0.000E+00 | 0.000E+00 |

| | 10th Surface | 11th Surface | 12th Surface | 13th Surface |
|---|---|---|---|---|
| k | 0.000E+00 | −8.870E+00 | 0.000E+00 | 0.000E+00 |
| A4 | −2.952E−01 | −1.978E−01 | 5.181E−02 | −2.830E−02 |
| A6 | 6.848E−02 | 9.697E−02 | −1.765E−03 | 5.885E−03 |
| A8 | 1.828E−02 | −4.198E−02 | −3.292E−04 | 3.450E−04 |
| A10 | −1.382E−02 | 1.385E−02 | −7.781E−05 | −2.434E−04 |
| A12 | 2.829E−03 | −2.880E−03 | 0.000E+00 | 0.000E+00 |
| A14 | −1.955E−04 | 2.569E−04 | 0.000E+00 | 0.000E+00 |
| A16 | 0.000E+00 | 0.000E+00 | 0.000E+00 | 0.000E+00 |

In this example, the aberration correction optical element NE as a double-sided aspheric optical element with virtually no refractive power is located between the first optical element group LG1 and the second optical element group LG2.

As shown in Table 1, the imaging lens in Numerical Example 1 satisfies all the conditional expressions (1) to (8).

Figure 2:
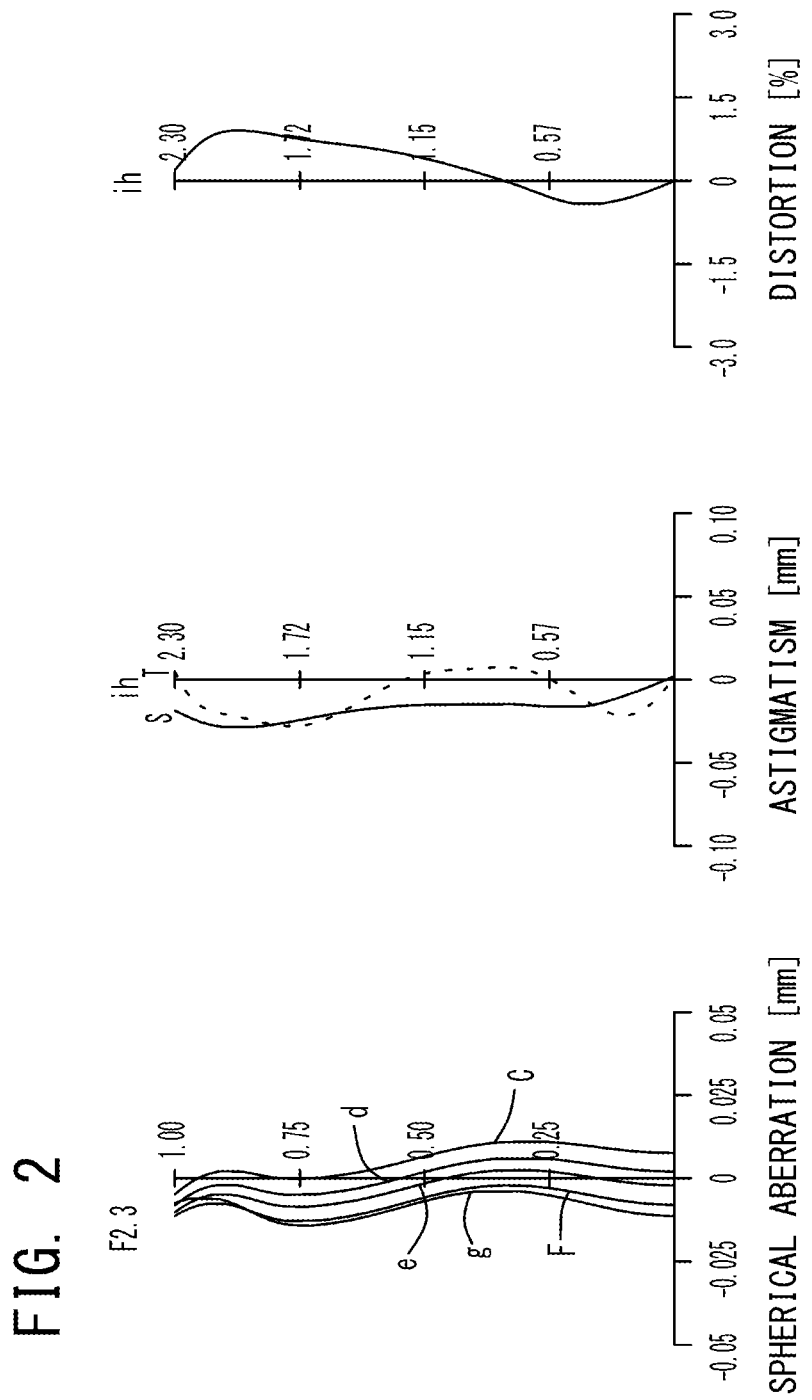
FIG. 2 shows spherical aberration, astigmatism, and distortion of the imaging lens in Numerical Example 1 according to the embodiment of the present invention.

FIG. 2 shows spherical aberration (mm), astigmatism (mm), and distortion (%) of the imaging lens in Numerical Example 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, and 10). As shown in FIG. 2, each aberration is corrected properly.

Numerical Example 2

The basic lens data of Numerical Example 2 is shown below.

Example 2 in mm
f = 3.05
Fno = 2.0
ω(°) = 36.9
ih = 2.30
TLA = 3.66
bf = 0.73

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.219 | | |
| 2* | 1.304 | 0.470 | 1.544 | 55.57 |
| 3* | 33.081 | 0.055 | | |
| 4* | 5.178 | 0.185 | 1.635 | 23.97 |
| 5* | 1.885 | 0.317 | | |
| 6* | Infinity | 0.397 | 1.535 | 56.16 |
| 7* | Infinity | 0.268 | | |
| 8* | −4.076 | 0.399 | 1.544 | 55.57 |
| 9* | −0.797 | 0.050 | | |
| 10* | 2.540 | 0.258 | 1.535 | 56.16 |
| 11* | 0.888 | 0.332 | | |
| 12* | −2.171 | 0.202 | 1.535 | 56.16 |
| 13* | −88.093 | 0.100 | | |
| 14 | Infinity | 0.210 | 1.517 | 64.20 |
| 15 | Infinity | 0.492 | | |
| Image Plane | Infinity | | | |

Constituent Lens Data

| Lens | Start Surface | Focal Length |
|---|---|---|
| 1 | 2 | 2.484 |
| 2 | 4 | −4.771 |
| 3 | 8 | 1.747 |
| 4 | 10 | −2.700 |
| 5 | 12 | −4.166 |

Lens Group Data

| | Lens | Focal Length |
|---|---|---|
| 1st Optical Element Group (LG1) | Lens 1, 2 | 4.173 |
| 2nd Optical Element Group (LG2) | Lens 3 | 1.747 |
| 3rd Optical Element Group (LG3) | Lens 4, 5 | −1.585 |

Aspheric Surface Data

| | 2nd Surface | 3rd Surface | 4th Surface | 5th Surface |
|---|---|---|---|---|
| k | 1.431E+00 | 0.000E+00 | 0.000E+00 | −1.409E+01 |
| A4 | −1.016E−01 | −3.916E−01 | −6.684E−01 | −1.013E−01 |
| A6 | 8.903E−02 | 2.164E+00 | 3.741E+00 | 1.666E+00 |
| A8 | −8.770E−01 | −7.462E+00 | −1.169E+01 | −4.070E+00 |
| A10 | 9.986E−01 | 1.754E+01 | 2.431E+01 | 6.173E+00 |
| A12 | 9.410E−01 | −2.541E+01 | −3.322E+01 | −7.179E+00 |
| A14 | −2.890E+00 | 1.497E+01 | 2.011E+01 | 4.510E+00 |
| A16 | 0.000E+00 | 0.000E+00 | 0.000E+00 | 0.000E+00 |

| | 6th Surface | 7th Surface | 8th Surface | 9th Surface |
|---|---|---|---|---|
| k | 0.000E+00 | 0.000E+00 | 0.000E+00 | −5.272E+00 |
| A4 | −2.703E−01 | −2.680E−01 | 3.336E−02 | −2.024E−01 |
| A6 | 3.019E−01 | 1.447E−01 | −1.512E−01 | 2.455E−01 |
| A8 | −3.316E−01 | −2.566E−01 | 1.434E−02 | −1.758E−01 |
| A10 | 9.248E−01 | 2.359E−01 | 5.448E−02 | 1.310E−01 |
| A12 | −7.408E−01 | 0.000E+00 | −5.099E−02 | −5.520E−02 |
| A14 | 0.000E+00 | 0.000E+00 | 0.000E+00 | 5.401E−03 |
| A16 | 0.000E+00 | 0.000E+00 | 0.000E+00 | 0.000E+00 |

| | 10th Surface | 11th Surface | 12th Surface | 13th Surface |
|---|---|---|---|---|
| k | 0.000E+00 | −8.223E+00 | 0.000E+00 | 0.000E+00 |
| A4 | −3.903E−01 | −2.001E−01 | 9.784E−02 | −3.858E−02 |
| A6 | 1.141E−01 | 1.024E−01 | −1.582E−02 | 6.108E−03 |
| A8 | 1.663E−02 | −4.089E−02 | 1.074E−04 | 8.148E−04 |
| A10 | −1.117E−02 | 1.211E−02 | 3.785E−04 | −2.850E−04 |
| A12 | 1.583E−03 | −2.867E−03 | 0.000E+00 | 0.000E+00 |
| A14 | −4.543E−04 | 3.292E−04 | 0.000E+00 | 0.000E+00 |
| A16 | 0.000E+00 | 0.000E+00 | 0.000E+00 | 0.000E+00 |

In this example, the aberration correction optical element NE as a double-sided aspheric optical element with virtually no refractive power is located between the first optical element group LG1 and the second optical element group LG2.

As shown in Table 1, the imaging lens in Numerical Example 2 satisfies all the conditional expressions (1) to (8).

Figure 4:
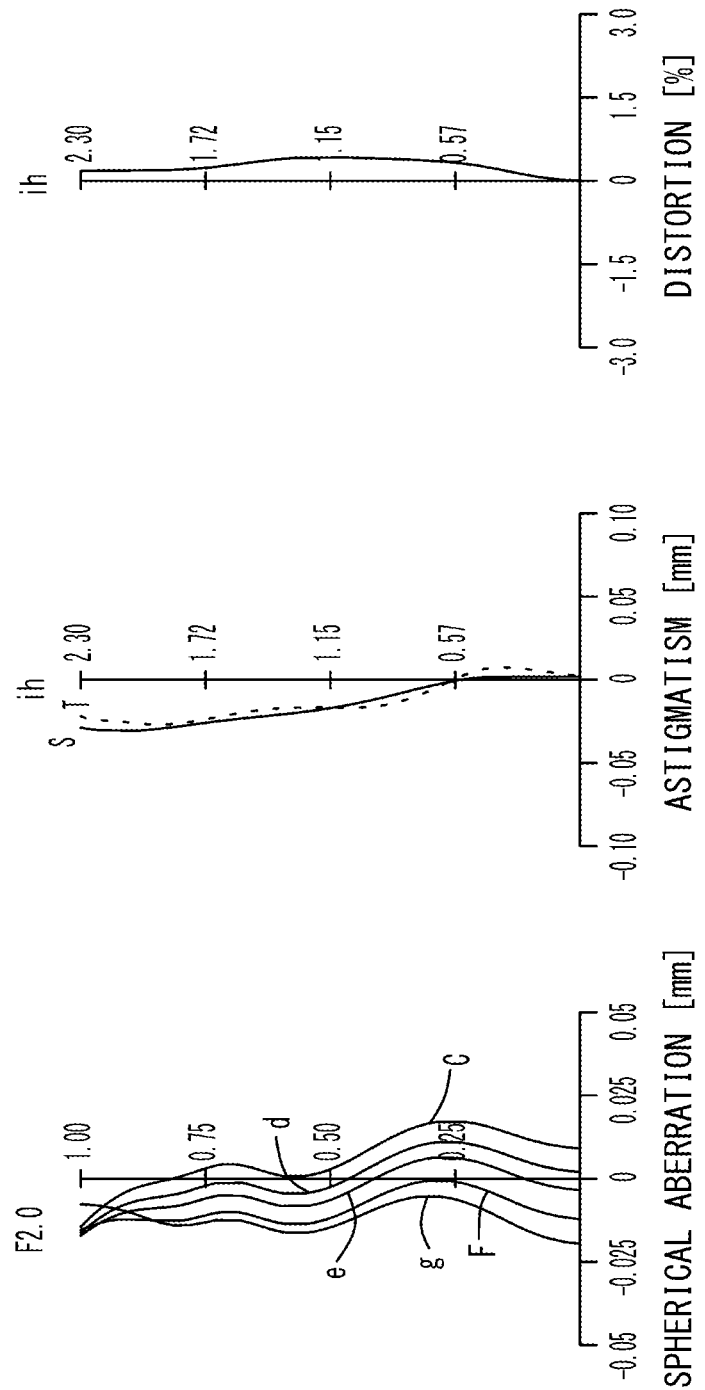
FIG. 4 shows spherical aberration, astigmatism, and distortion of the imaging lens in Numerical Example 2 according to the embodiment of the present invention.

FIG. 4 shows spherical aberration (mm), astigmatism (mm), and distortion (%) of the imaging lens in Numerical Example 2. As shown in FIG. 4, each aberration is corrected properly.

Numerical Example 3

The basic lens data of Numerical Example 3 is shown below.

Example 3 in mm
f = 2.99
Fno = 2.0
ω(°) = 37.5
ih = 2.30
TLA = 3.58
bf = 0.73

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.210 | | |
| 2* | 1.282 | 0.477 | 1.544 | 55.57 |
| 3* | 20.754 | 0.051 | | |
| 4* | 10.755 | 0.185 | 1.635 | 23.97 |
| 5* | 2.539 | 0.332 | | |
| 6* | Infinity | 0.322 | 1.535 | 56.16 |
| 7* | Infinity | 0.318 | | |
| 8* | −8.022 | 0.456 | 1.544 | 55.57 |
| 9* | −0.825 | 0.023 | | |
| 10* | 2.066 | 0.201 | 1.535 | 56.16 |
| 11* | 0.865 | 0.285 | | |
| 12* | −2.7187 | 0.202 | 1.535 | 56.16 |
| 13* | 3.5886 | 0.100 | | |
| 14 | Infinity | 0.210 | 1.517 | 64.20 |
| 15 | Infinity | 0.493 | | |
| Image Plane | Infinity | | | |

-continued

Constituent Lens Data

| Lens | Start Surface | Focal Length |
|---|---|---|
| 1 | 2 | 2.491 |
| 2 | 4 | −5.282 |
| 3 | 8 | 1.653 |
| 4 | 10 | −2.956 |
| 5 | 12 | −2.861 |

Lens Group Data

| | Lens | Focal Length |
|---|---|---|
| 1st Optical Element Group (LG1) | Lens 1, 2 | 3.966 |
| 2nd Optical Element Group (LG2) | Lens 3 | 1.653 |
| 3rd Optical Element Group (LG3) | Lens 4, 5 | −1.396 |

Aspheric Surface Data

| | 2nd Surface | 3rd Surface | 4th Surface | 5th Surface |
|---|---|---|---|---|
| k   | 1.293E+00  | 0.000E+00  | 0.000E+00  | −1.271E+01 |
| A4  | −1.049E−01 | −4.594E−01 | −6.812E−01 | −2.040E−01 |
| A6  | 1.231E−01  | 2.171E+00  | 3.685E+00  | 1.741E+00  |
| A8  | −9.581E−01 | −7.603E+00 | −1.145E+01 | −3.786E+00 |
| A10 | 8.715E−01  | 1.786E+01  | 2.469E+01  | 6.144E+00  |
| A12 | 1.106E+00  | −2.483E+01 | −3.313E+01 | −7.266E+00 |
| A14 | −2.855E+00 | 1.387E+01  | 1.904E+01  | 4.255E+00  |
| A16 | 0.000E+00  | 0.000E+00  | 0.000E+00  | 0.000E+00  |

| | 6th Surface | 7th Surface | 8th Surface | 9th Surface |
|---|---|---|---|---|
| k   | 0.000E+00  | 0.000E+00  | 0.000E+00  | −6.986E+00 |
| A4  | −3.816E−01 | −3.820E−01 | 5.736E−02  | −1.275E−01 |
| A6  | 2.561E−01  | 1.933E−01  | −1.925E−01 | 1.794E−01  |
| A8  | −2.727E−01 | −2.178E−01 | 2.738E−04  | −1.991E−01 |
| A10 | 9.869E−01  | 2.846E−01  | 1.566E−01  | 1.463E−01  |
| A12 | −6.473E−01 | 0.000E+00  | −8.735E−02 | −4.306E−02 |
| A14 | 0.000E+00  | 0.000E+00  | 0.000E+00  | 9.832E−04  |
| A16 | 0.000E+00  | 0.000E+00  | 0.000E+00  | 0.000E+00  |

| | 10th Surface | 11th Surface | 12th Surface | 13th Surface |
|---|---|---|---|---|
| k   | 0.000E+00  | −9.974E+00 | 0.000E+00  | 0.000E+00  |
| A4  | −4.381E−01 | −1.733E−01 | 1.058E−01  | −1.012E−01 |
| A6  | 1.100E−01  | 1.042E−01  | −2.174E−02 | 1.478E−02  |
| A8  | 1.595E−02  | −4.139E−02 | −2.151E−04 | 8.756E−04  |
| A10 | −7.046E−03 | 1.212E−02  | 3.759E−04  | −3.461E−04 |
| A12 | 2.140E−03  | −3.154E−03 | 0.000E+00  | 0.000E+00  |
| A14 | −9.371E−04 | 3.888E−04  | 0.000E+00  | 0.000E+00  |
| A16 | 0.000E+00  | 0.000E+00  | 0.000E+00  | 0.000E+00  |

In this example, the aberration correction optical element NE as a double-sided aspheric optical element with virtually no refractive power is located between the first optical element group LG1 and the second optical element group LG2.

As shown in Table 1, the imaging lens in Numerical Example 3 satisfies all the conditional expressions (1) to (8).

Figure 6:
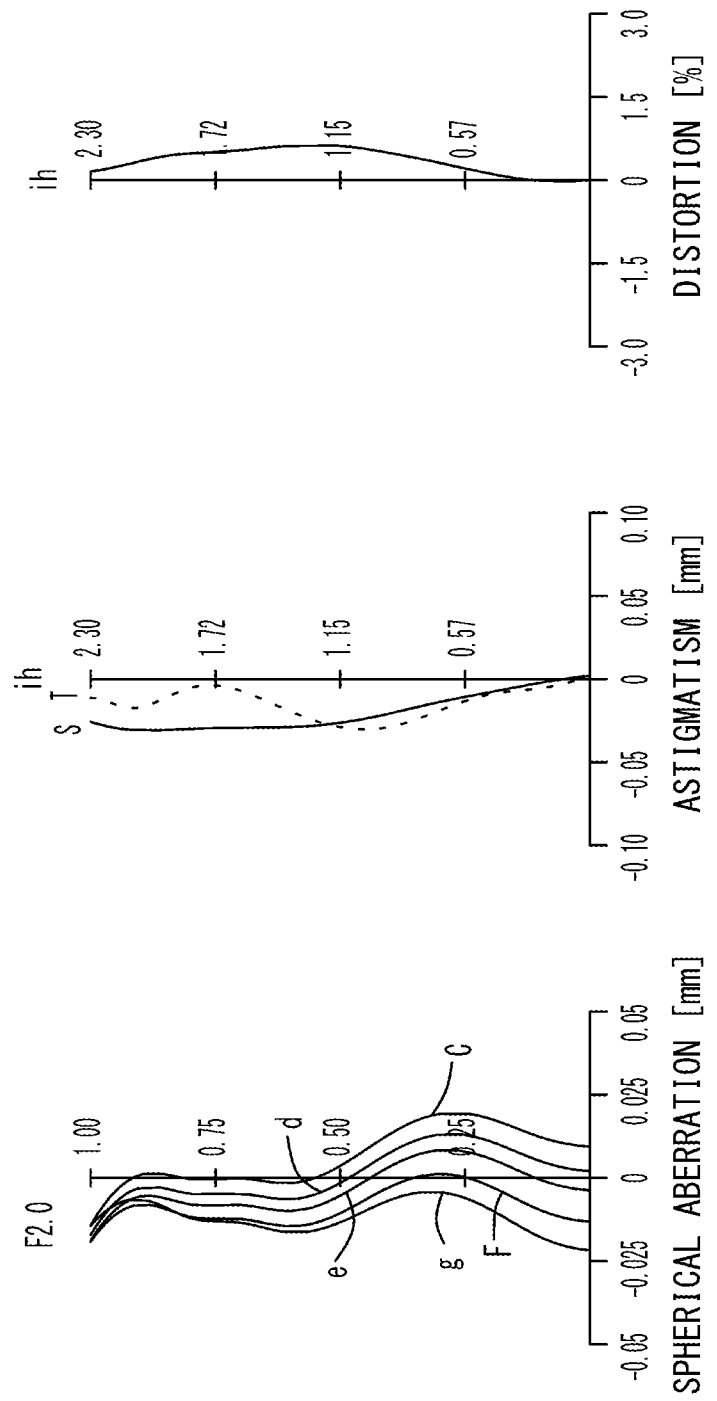
FIG. 6 shows spherical aberration, astigmatism, and distortion of the imaging lens in Numerical Example 3 according to the embodiment of the present invention.

FIG. 6 shows spherical aberration (mm), astigmatism (mm), and distortion (%) of the imaging lens in Numerical Example 3. As shown in FIG. 6, each aberration is corrected properly.

Numerical Example 4

The basic lens data of Numerical Example 4 is shown below.

Example 4 in mm
f = 2.96
Fno = 2.2
ω(°) = 37.7
ih = 2.30
TLA = 3.48
bf = 0.78

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.170 | | |
| 2* | 1.224 | 0.426 | 1.544 | 55.57 |
| 3* | 10.988 | 0.051 | | |
| 4* | 13.353 | 0.185 | 1.635 | 23.97 |
| 5* | 2.906 | 0.325 | | |
| 6* | Infinity | 0.303 | 1.535 | 56.16 |
| 7* | Infinity | 0.301 | | |
| 8* | −3.565 | 0.399 | 1.544 | 55.57 |
| 9* | −0.835 | 0.025 | | |
| 10* | 1.805 | 0.204 | 1.614 | 25.58 |
| 11* | 1.056 | 0.284 | | |
| 12* | −1.9849 | 0.202 | 1.535 | 56.16 |
| 13* | 4.4561 | 0.100 | | |
| 14 | Infinity | 0.210 | 1.517 | 64.20 |
| 15 | Infinity | 0.541 | | |
| Image Plane | Infinity | | | |

Constituent Lens Data

| Lens | Start Surface | Focal Length |
|---|---|---|
| 1 | 2 | 2.496 |
| 2 | 4 | −5.890 |
| 3 | 8 | 1.908 |
| 4 | 10 | −4.624 |
| 5 | 12 | −2.541 |

Lens Group Data

| | Lens | Focal Length |
|---|---|---|
| 1st Optical Element Group (LG1) | Lens 1, 2 | 3.772 |
| 2nd Optical Element Group (LG2) | Lens 3 | 1.908 |
| 3rd Optical Element Group (LG3) | Lens 4, 5 | −1.612 |

Aspheric Surface Data

| | 2nd Surface | 3rd Surface | 4th Surface | 5th Surface |
|---|---|---|---|---|
| k   | 1.095E+00  | 0.000E+00  | 0.000E+00  | −3.824E+00 |
| A4  | −1.143E−01 | −5.234E−01 | −6.455E−01 | −1.834E−01 |
| A6  | 9.929E−02  | 2.175E+00  | 3.650E+00  | 1.744E+00  |
| A8  | −9.905E−01 | −7.616E+00 | −1.144E+01 | −3.747E+00 |
| A10 | 8.262E−01  | 1.779E+01  | 2.489E+01  | 6.188E+00  |
| A12 | 1.047E+00  | −2.477E+01 | −3.299E+01 | −7.255E+00 |
| A14 | −3.362E+00 | 1.390E+01  | 1.911E+01  | 4.199E+00  |
| A16 | 0.000E+00  | 0.000E+00  | 0.000E+00  | 0.000E+00  |

| | 6th Surface | 7th Surface | 8th Surface | 9th Surface |
|---|---|---|---|---|
| k   | 0.000E+00  | 0.000E+00  | 0.000E+00  | −6.401E+00 |
| A4  | −4.098E−01 | −4.195E−01 | 1.462E−01  | −6.621E−02 |
| A6  | 2.652E−01  | 1.574E−01  | −3.260E−01 | 1.753E−01  |
| A8  | −2.188E−01 | −2.245E−01 | 2.316E−02  | −2.220E−01 |
| A10 | 1.110E+00  | 4.030E−01  | 2.108E−01  | 1.355E−01  |
| A12 | −8.530E−01 | 0.000E+00  | −1.584E−01 | −4.372E−02 |
| A14 | 0.000E+00  | 0.000E+00  | 0.000E+00  | 3.142E−03  |
| A16 | 0.000E+00  | 0.000E+00  | 0.000E+00  | 0.000E+00  |

-continued

| | 10th Surface | 11th Surface | 12th Surface | 13th Surface |
|---|---|---|---|---|
| k | 0.000E+00 | −1.367E+01 | 0.000E+00 | 0.000E+00 |
| A4 | −4.092E−01 | −2.448E−01 | 8.945E−02 | −6.368E−02 |
| A6 | 9.389E−02 | 1.141E−01 | −1.733E−02 | 5.938E−03 |
| A8 | 1.368E−02 | −3.849E−02 | 1.641E−03 | −1.097E−03 |
| A10 | −5.921E−03 | 1.344E−02 | 5.221E−04 | 1.031E−04 |
| A12 | 1.770E−03 | −3.254E−03 | 0.000E+00 | 0.000E+00 |
| A14 | −1.281E−03 | 2.531E−04 | 0.000E+00 | 0.000E+00 |
| A16 | 0.000E+00 | 0.000E+00 | 0.000E+00 | 0.000E+00 |

In this example, the aberration correction optical element NE as a double-sided aspheric optical element with virtually no refractive power is located between the first optical element group LG1 and the second optical element group LG2.

As shown in Table 1, the imaging lens in Numerical Example 4 satisfies all the conditional expressions (1) to (8).

Figure 8:
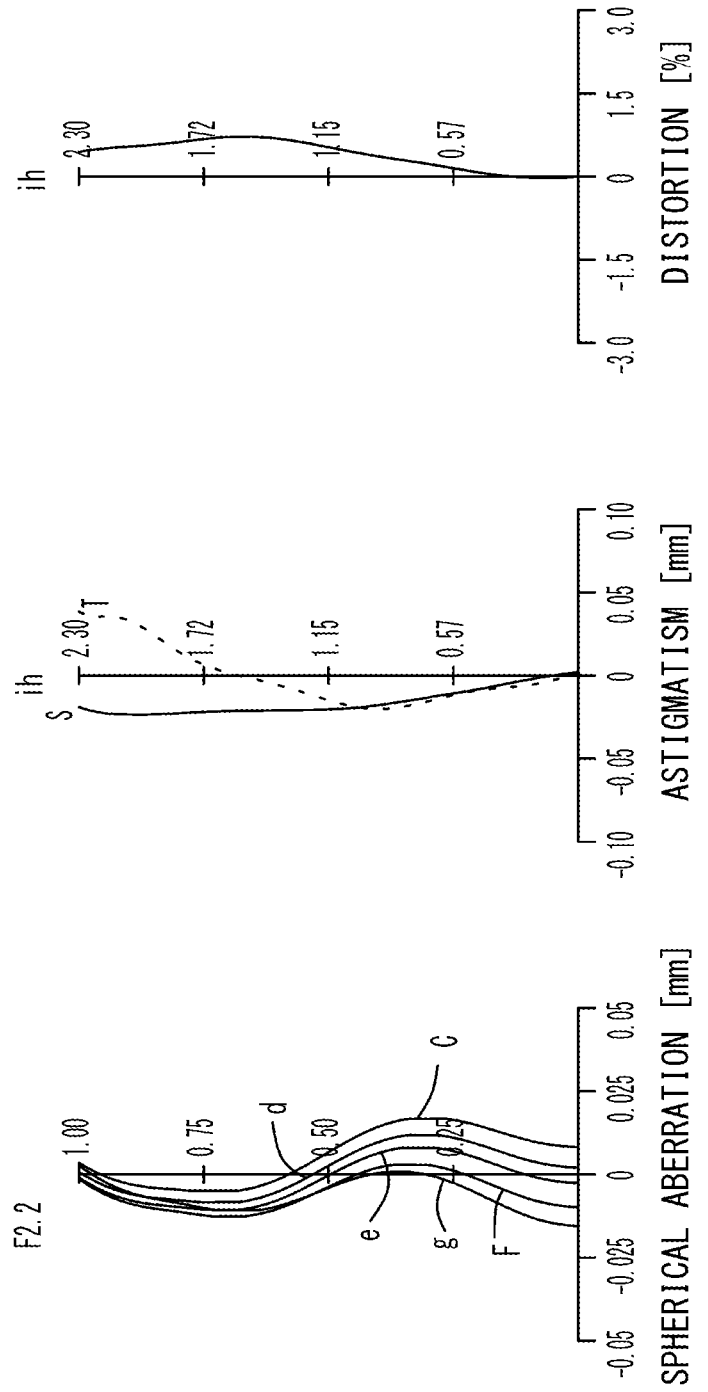
FIG. 8 shows spherical aberration, astigmatism, and distortion of the imaging lens in Numerical Example 4 according to the embodiment of the present invention.
Figure 9:
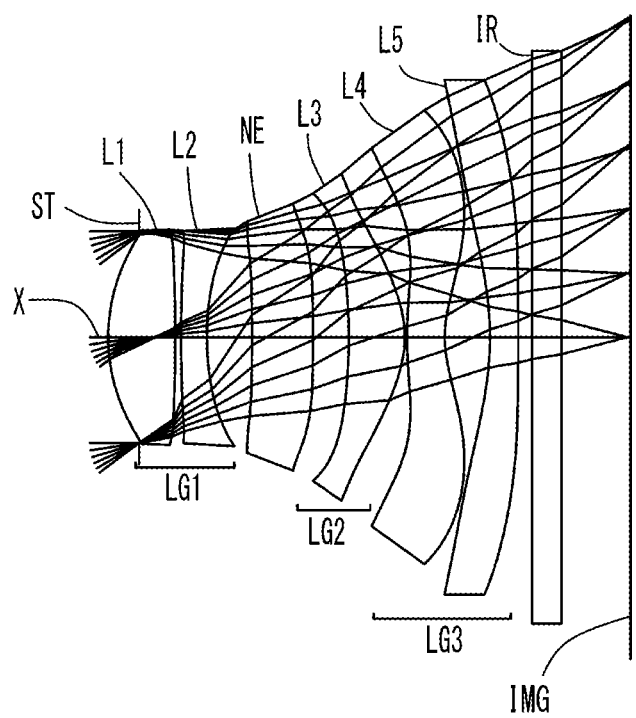
FIG. 9 is a schematic view showing the general configuration of an imaging lens in Numerical Example 5 according to the embodiment of the present invention.

FIG. 8 shows spherical aberration (mm), astigmatism (mm), and distortion (%) of the imaging lens in Numerical Example 4. As shown in FIG. 8, each aberration is corrected properly.

Numerical Example 5

The basic lens data of Numerical Example 5 is shown below.

Example 5 in mm
f = 3.04
Fno = 2.0
ω(°) = 37.0
ih = 2.30
TLA = 3.66
bf = 0.73

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.221 | | |
| 2* | 1.295 | 0.478 | 1.544 | 55.57 |
| 3* | −90.000 | 0.042 | | |
| 4* | 5.230 | 0.185 | 1.635 | 23.97 |
| 5* | 1.780 | 0.324 | | |
| 6* | Infinity | 0.434 | 1.535 | 56.16 |
| 7* | Infinity | 0.257 | | |
| 8* | −3.940 | 0.401 | 1.544 | 55.57 |
| 9* | −0.746 | 0.015 | | |
| 10* | 2.581 | 0.271 | 1.535 | 56.16 |
| 11* | 0.812 | 0.323 | | |
| 12* | −2.1793 | 0.202 | 1.535 | 56.16 |
| 13* | −90.0000 | 0.100 | | |
| 14 | Infinity | 0.210 | 1.517 | 64.20 |
| 15 | Infinity | 0.491 | | |
| Image Plane | Infinity | | | |

Constituent Lens Data

| Lens | Start Surface | Focal Length |
|---|---|---|
| 1 | 2 | 2.352 |
| 2 | 4 | −4.340 |
| 3 | 8 | 1.621 |
| 4 | 10 | −2.342 |
| 5 | 12 | −4.181 |

Lens Group Data

| | Lens | Focal Length |
|---|---|---|
| 1st Optical Element Group (LG1) | Lens 1, 2 | 4.065 |
| 2nd Optical Element Group (LG2) | Lens 3 | 1.621 |
| 3rd Optical Element Group (LG3) | Lens 4, 5 | −1.449 |

Aspheric Surface Data

| | 2nd Surface | 3rd Surface | 4th Surface | 5th Surface |
|---|---|---|---|---|
| k | 1.400E+00 | 0.000E+00 | 0.000E+00 | −1.030E+01 |
| A4 | −9.533E−02 | −3.619E−01 | −6.459E−01 | −1.236E−01 |
| A6 | 7.999E−02 | 2.175E+00 | 3.721E+00 | 1.676E+00 |
| A8 | −9.243E−01 | −7.599E+00 | −1.167E+01 | −3.984E+00 |
| A10 | 1.047E+00 | 1.770E+01 | 2.440E+01 | 6.095E+00 |
| A12 | 1.092E+00 | −2.515E+01 | −3.311E+01 | −7.168E+00 |
| A14 | −3.108E+00 | 1.452E+01 | 1.974E+01 | 4.510E+00 |
| A16 | 0.000E+00 | 0.000E+00 | 0.000E+00 | 0.000E+00 |

| | 6th Surface | 7th Surface | 8th Surface | 9th Surface |
|---|---|---|---|---|
| k | 0.000E+00 | 0.000E+00 | 0.000E+00 | −5.504E+00 |
| A4 | −2.495E−01 | −2.601E−01 | 4.933E−02 | −2.025E−01 |
| A6 | 2.804E−01 | 1.442E−01 | −1.711E−01 | 2.405E−01 |
| A8 | −3.658E−01 | −2.674E−01 | 2.357E−03 | −1.740E−01 |
| A10 | 9.930E−01 | 2.402E−01 | 8.243E−02 | 1.340E−01 |
| A12 | −7.650E−01 | 0.000E+00 | −5.936E−02 | −5.416E−02 |
| A14 | 0.000E+00 | 0.000E+00 | 0.000E+00 | 3.884E−03 |
| A16 | 0.000E+00 | 0.000E+00 | 0.000E+00 | 0.000E+00 |

| | 10th Surface | 11th Surface | 12th Surface | 13th Surface |
|---|---|---|---|---|
| k | 0.000E+00 | −8.862E+00 | 0.000E+00 | 0.000E+00 |
| A4 | −4.168E−01 | −2.110E−01 | 9.999E−02 | −3.193E−02 |
| A6 | 1.262E−01 | 1.105E−01 | −1.622E−02 | 2.491E−03 |
| A8 | 1.634E−02 | −4.262E−02 | −1.281E−04 | 1.423E−03 |
| A10 | −1.045E−02 | 1.179E−02 | 4.220E−04 | −3.129E−04 |
| A12 | 2.257E−03 | −2.696E−03 | 0.000E+00 | 0.000E+00 |
| A14 | −9.585E−04 | 3.113E−04 | 0.000E+00 | 0.000E+00 |
| A16 | 0.000E+00 | 0.000E+00 | 0.000E+00 | 0.000E+00 |

In this example, the aberration correction optical element NE as a double-sided aspheric optical element with virtually no refractive power is located between the first optical element group LG1 and the second optical element group LG2.

As shown in Table 1, the imaging lens in Numerical Example 5 satisfies all the conditional expressions (1) to (8).

FIG. 10 shows spherical aberration (mm), astigmatism (mm), and distortion (%) of the imaging lens in Numerical Example 5. As shown in FIG. 10, each aberration is corrected properly.

TABLE 1

| | Example 1 | Example 2 | Example 3 | Example 4 | Example 5 |
|---|---|---|---|---|---|
| (1) TN/f | 0.291 | 0.322 | 0.325 | 0.314 | 0.333 |
| (2) vdN | 56.16 | 56.16 | 56.16 | 56.16 | 56.16 |
| (3) fLG1/f | 1.312 | 1.369 | 1.325 | 1.274 | 1.335 |
| (4) fLG2/f | 0.499 | 0.573 | 0.553 | 0.644 | 0.532 |
| (5) fLG3/f | −0.456 | −0.520 | −0.467 | −0.544 | −0.476 |
| (6) (r5 + r6)/(r5 − r6) | 1.911 | 1.486 | 1.229 | 1.612 | 1.467 |
| (7) fLG1 > fLG2 | 3.991> 1.519 | 4.173> 1.747 | 3.966> 1.653 | 3.772> 1.908 | 4.065> 1.621 |
| (8) fLG2 > \|fLG3\| | 1.519> 1.388 | 1.747> 1.585 | 1.653> 1.396 | 1.908> 1.612 | 1.621> 1.449 |

As explained above, the imaging lenses composed of six optical elements in the examples according to this embodiment of the present invention are compact enough to meet the growing demand for low-profileness, with a total track length of 4.0 mm or less, though they use five optical elements and one aberration correction optical element with virtually no refractive power, that is, six optical elements in total. When the degree of low-profileness is expressed by the ratio of total track length TLA to maximum image height ih (TLA/2ih), the ratio (TLA/2ih) of each of these imaging lenses is 0.8 or less. In addition, the imaging lenses offer a wider field of view (70 degrees or more) than existing imaging lenses and brightness with an F-value of 2.5 or less, and correct various aberrations properly and can be manufactured at low cost.

When any one of the imaging lenses composed of six optical elements in the examples according to this embodiment of the present invention is used in the optical system built in the image pickup device mounted in an increasingly compact and low-profile mobile terminal such as a smartphone, mobile phone or PDA (Personal Digital Assistant), a game console, an information terminal such as a PC, or a home appliance with a camera function, it contributes to the compactness of the image pickup device and provides high camera performance.

The effects of the present invention are as follows.

According to the present invention, there is provided a compact low-cost imaging lens which meets the demand for low-profileness, offers brightness with an F-value of 2.5 or less and a wide field of view, and corrects various aberrations properly.

What is claimed is:

1. An imaging lens that forms an image of an object, the imaging lens having three optical element groups arranged sequentially from first to third optical element groups from an object side to an image side of the imaging lens, comprising:
    the first optical element group having positive refractive power and including, in order from the object side to the image side of the imaging lens:
        a first optical element that is a first lens with positive refractive power having a convex surface facing the object side; and
        a second optical element that is a second lens with negative refractive power having a concave surface facing the image side;
    a second optical element group having positive refractive power and including:
        a third optical element that is a third lens with positive refractive power having a convex surface facing the image side;
    the third optical element group having negative refractive power and including, in order from the object side to the image side of the imaging lens:
        a fourth optical element that is a fourth lens that is a double-sided aspheric lens with negative refractive power having a concave surface facing the image side, an image-side surface of the fourth lens having at least one pole-change point off an optical axis of the imaging lens; and
        a fifth optical element that is a fifth lens that is a double-sided aspheric lens having a concave surface facing the object side; and
    a sixth optical element that is a double-sided aspheric aberration correction optical element with virtually no refractive power located in an air gap between the first optical element group and the second optical element group,
    wherein a conditional expression (2a) below is satisfied:

$$50 < vdN < 60 \tag{2a}$$

where vdN is an Abbe number of the sixth optical element at d-ray.

2. The imaging lens according to claim 1, wherein a conditional expression (1) below is satisfied:

$$0.1 < TN/f < 0.5 \tag{1}$$

where
TN is a distance on the optical axis between lenses where the sixth optical element is located, and
f is a focal length of an overall optical system of the imaging lens.

3. The imaging lens according to claim 1, wherein aspheric surfaces on both sides of the sixth optical element are shaped so as to each curve toward the object side with increasing distance from the optical axis.

4. The imaging lens according to claim 1, wherein a conditional expression (3) below is satisfied:

$$1.0 < fLG1/f < 2.0 \tag{3}$$

where
fLG1 is a focal length of the first optical element group, and
f is a focal length of an overall optical system of the imaging lens.

5. The imaging lens according to claim 1, wherein a conditional expression (4) below is satisfied:

$$0.3 < fLG2/f < 1.0 \tag{4}$$

where
fLG2 is a focal length of the second optical element group, and
f is a focal length of an overall optical system of the imaging lens.

6. The imaging lens according to claim 1, wherein a conditional expression (5) below is satisfied:

$$-0.8 < fLG3/f < -0.2 \tag{5}$$

where
fLG3 is a focal length of the third optical element group, and
f is a focal length of an overall optical system of the imaging lens.

7. The imaging lens according to claim 1, wherein a conditional expression (6) below is satisfied:

$$0.8 < (r5+r6)/(r5-r6) < 2.5 \tag{6}$$

where
r5 is a curvature radius of an object-side surface of the third lens, and
r6 is a curvature radius of an image-side surface of the third lens.

* * * * *